(12) United States Patent
Kotecha

(10) Patent No.: US 8,509,160 B2
(45) Date of Patent: Aug. 13, 2013

(54) METHOD FOR EFFICIENT CQI FEEDBACK

(75) Inventor: Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 1344 days.

(21) Appl. No.: 12/028,897

(22) Filed: Feb. 11, 2008

(65) Prior Publication Data

US 2009/0201861 A1    Aug. 13, 2009

(51) Int. Cl.
*H04W 4/00* (2009.01)
*H04W 72/00* (2009.01)
*H04M 1/00* (2006.01)

(52) U.S. Cl.
USPC ........... 370/329; 370/332; 455/450; 455/464; 455/509

(58) Field of Classification Search
USPC .......................................................... 370/329
See application file for complete search history.

(56) References Cited

U.S. PATENT DOCUMENTS

| | | | |
|---|---|---|---|
| 7,370,285 B1* | 5/2008 | Nickerson et al. | 715/808 |
| 8,073,069 B2* | 12/2011 | Mundarath et al. | 375/267 |
| 2003/0148770 A1* | 8/2003 | Das et al. | 455/455 |
| 2005/0143084 A1* | 6/2005 | Cheng et al. | 455/452.2 |
| 2006/0253800 A1* | 11/2006 | Jones et al. | 715/810 |
| 2007/0177501 A1* | 8/2007 | Papasakellariou | 370/229 |
| 2008/0032633 A1* | 2/2008 | Harrison et al. | 455/69 |
| 2008/0085717 A1* | 4/2008 | Chhabra et al. | 455/450 |
| 2008/0130584 A1* | 6/2008 | Pani et al. | 370/332 |
| 2008/0305818 A1* | 12/2008 | Ko et al. | 455/509 |
| 2009/0203383 A1* | 8/2009 | Shen et al. | 455/450 |
| 2010/0323737 A1* | 12/2010 | Koo et al. | 455/509 |

OTHER PUBLICATIONS

3rd Generation Partnership Project; Technical Specification Group Radio Access Network; Evolved Universal Terrestrial Radio Access (E-UTRA); Physical Channels and Modulation (Release 8), v8.1.0 (Nov. 2007).
3rd Generation Partnership Project; Technical Specification Group Radio Access Network; Evolved Universal Terrestrial Radio Access (E-UTRA); Multiplexing and Channel Coding (Release 8), v8.1.0 (Nov. 2007).
3rd Generation Partnership Project; Technical Specification Group Radio Access Network; Evolved Universal Terrestrial Radio Access (E-UTRA); Physical Layer Procedures (Release 8), v8.1.0 (Nov. 2007).
3rd Generation Partnership Project; Technical Specification Group Radio Access Network; Evolved Universal Terrestrial Radio Access (E-UTRA); Physical Layer—Measurements (Release 8), v8.1.0 (Nov. 2007).

* cited by examiner

*Primary Examiner* — Guang Li
(74) *Attorney, Agent, or Firm* — Gazdzinski & Associates, PC

(57) ABSTRACT

In a closed-loop wireless communication system (300), channel-side information—such as CQI information, rank adaptation information or MIMO codebook selection information—is fed back to the transmitter (310) in response to a start message (301) using a configurable or default time period or window by having the receiver (320) automatically terminate feedback upon expiration of the time period/window. The receiver (330) may continue or interrupt the feedback upon receipt of appropriate messaging (e.g., 306) from the transmitter (310).

20 Claims, 4 Drawing Sheets

METHOD FOR EFFICIENT CQI FEEDBACK

BACKGROUND OF THE INVENTION

1. Field of the Invention

The present invention is directed in general to a field of information processing. In one aspect, the present invention relates to a system and method for transmitting channel feedback information from one or more receivers.

2. Description of the Related Art

Wireless communication systems transmit and receive signals within a designated electromagnetic frequency spectrum, but capacity of the electromagnetic frequency spectrum is limited. An example of such a wireless communication system is a Multiple Input Multiple Output (MIMO) system, such as the 3GPP LTE (Long Term Evolution) system depicted in FIG. 1, which schematically illustrates the architecture of an LTE wireless communication system 1. As depicted, the broadcast server 28 communicates through an EPC 26 (Evolved Packet Core) which is connected to one or more access gateways (AGW) 22, 24 that control transceiver devices 2, 4, 6, 8 which communicate with the end user devices 10-15. In the LTE architecture, the transceiver devices 2, 4, 6, 8 may be implemented with base transceiver stations (referred to as enhanced Node-B or eNB devices) which in turn are coupled to Radio Network Controllers or access gateway (AGW) devices 22, 24 which make up the UMTS radio access network (collectively referred to as the UMTS Terrestrial Radio Access Network (UTRAN)). Each transceiver device 2, 4, 6, 8 includes transmit and receive circuitry that is used to communicate directly with any mobile end user(s) 10-15 located in each transceiver device's respective cell region. Thus, transceiver device 2 includes a cell region 3 having one or more sectors in which one or more mobile end users 13, 14 are located. Similarly, transceiver device 4 includes a cell region 5 having one or more sectors in which one or more mobile end users 15 are located, transceiver device 6 includes a cell region 7 having one or more sectors in which one or more mobile end users 10, 11 are located, and transceiver device 8 includes a cell region 9 having one or more sectors in which one or more mobile end users 12 are located. With the LTE architecture, the eNBs 2, 4, 6, 8 are connected by an S1 interface to the EPC 26, where the S1 interface supports a many-to-many relation between AGWs 22, 24 and the eNBs 2, 4, 6, 8.

As will be appreciated, each transceiver device (e.g., eNB 2) in the wireless communication system 1 includes a transmit antenna array and communicates with receiver device (e.g., user equipment 15) having a receive antenna array, where each antenna array includes one or more antennas. The wireless communication system 1 may be any type of wireless communication system, including but not limited to a MIMO system, SDMA system, CDMA system, SC-FDMA system, OFDMA system, OFDM system, etc. Of course, the receiver/subscriber stations (e.g., user equipment 15) can also transmit signals which are received by the transmitter/base station (e.g., eNB 2). The signals communicated between the receiver/subscriber stations and transmitter/base station can include voice, data, electronic mail, video, and other data, voice, and video signals.

Various transmission strategies require the transmitter to have some level of knowledge concerning the channel response between the transmitter and each receiver, and are often referred to as "closed-loop" systems. An example application of closed-loop systems which exploit channel-side information at the transmitter ("CSIT") are precoding systems, such as space division multiple access (SDMA), which use closed-loop systems to improve spectrum usage efficiency by applying precoding at the transmitter to take into account the transmission channel characteristics, thereby improving data rates and link reliability. SDMA based methods have been adopted in several current emerging standards such as IEEE 802.16 and the 3rd Generation Partnership Project (3GPP) Long Term Evolution (LTE) platform. With such precoding systems, CSIT can be used with a variety of communication techniques to operate on the transmit signal before transmitting from the transmit antenna array. For example, precoding techniques can provide a multi-mode beamformer function to optimally match the input signal on one side to the channel on the other side. In situations where channel conditions can be provided to the transmitter, closed loop methods, such as MIMO precoding, can be used. Precoding techniques may be used to decouple the transmit signal into orthogonal spatial stream/beams, and additionally may be used to send more power along the beams where the channel is strong, but less or no power along the weak, thus enhancing system performance by improving data rates and link reliability. In addition to multi-stream transmission and power allocation techniques, adaptive modulation and coding (AMC) techniques can use CSIT to operate on the transmit signal before transmission on the transmit array.

With conventional closed-loop MIMO systems, full broadband channel knowledge at the transmitter may be obtained by using uplink sounding techniques (e.g., with Time Division Duplexing (TDD) systems). Alternatively, channel feedback techniques can be used with MIMO systems (e.g., with TDD or Frequency Division Duplexing (FDD) systems) to feedback channel information to the transmitter. One way of implementing channel information feedback is to use codebook-based techniques to reduce the amount of feedback as compared to full channel feedback. However, even when codebook-based techniques are used to quantize the channel feedback information, feedback from multiple receivers can cause an uplink bottleneck. Specifically, allowing all users to feedback causes the total feedback rate to increase linearly with the number of users, placing a burden on the uplink control channel shared by all users (e.g., as proposed by 3GPP LTE). Prior solutions to the uplink bottleneck problem have attempted to schedule the feedback of channel quality indicator (CQI) reports from different user equipment (UE) receivers by periodically feeding back CQI reports from each UE at regular or predetermined intervals so that the base station can assemble and use the CQI reports to schedule UEs for transmission. Typically, the base station (e.g., eNB 8) controls the scheduling of CQI feedback from its UEs (e.g., UE 12) by transmitting configuration messages to each UE that include a "start" message (e.g., 16) and a subsequent "stop" message (e.g., 17) to start and stop the periodic CQI feedback, and also a "change rate" message (not shown) which changes the period of the CQI reporting if required. Between the start and stop messages (e.g., 16, 17), the UE generates periodic CQI reports (e.g., 21) that are fed back to the base station. Over the course of time 23, the process is repeated by sending additional start and stop messages (e.g., 18, 19) to enable each UE to send back periodic CQI reports (e.g., 23). However, there is a significant amount of feedback control channel overhead (and associated bandwidth) required to configure periodic CQI reporting by transmitting the "start" and "stop" messages to each UE, particularly when there are many UEs in a cell. In addition, there is a significant amount of feedback control channel overhead (and associated bandwidth) required for feeding back periodic CQI reports from all UEs in a cell which can impair uplink performance by overwhelming and/or delaying CQI feedback reporting.

Accordingly, an efficient feedback methodology is needed to provide the channel information to the transmitter while reducing the amount of required overhead. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
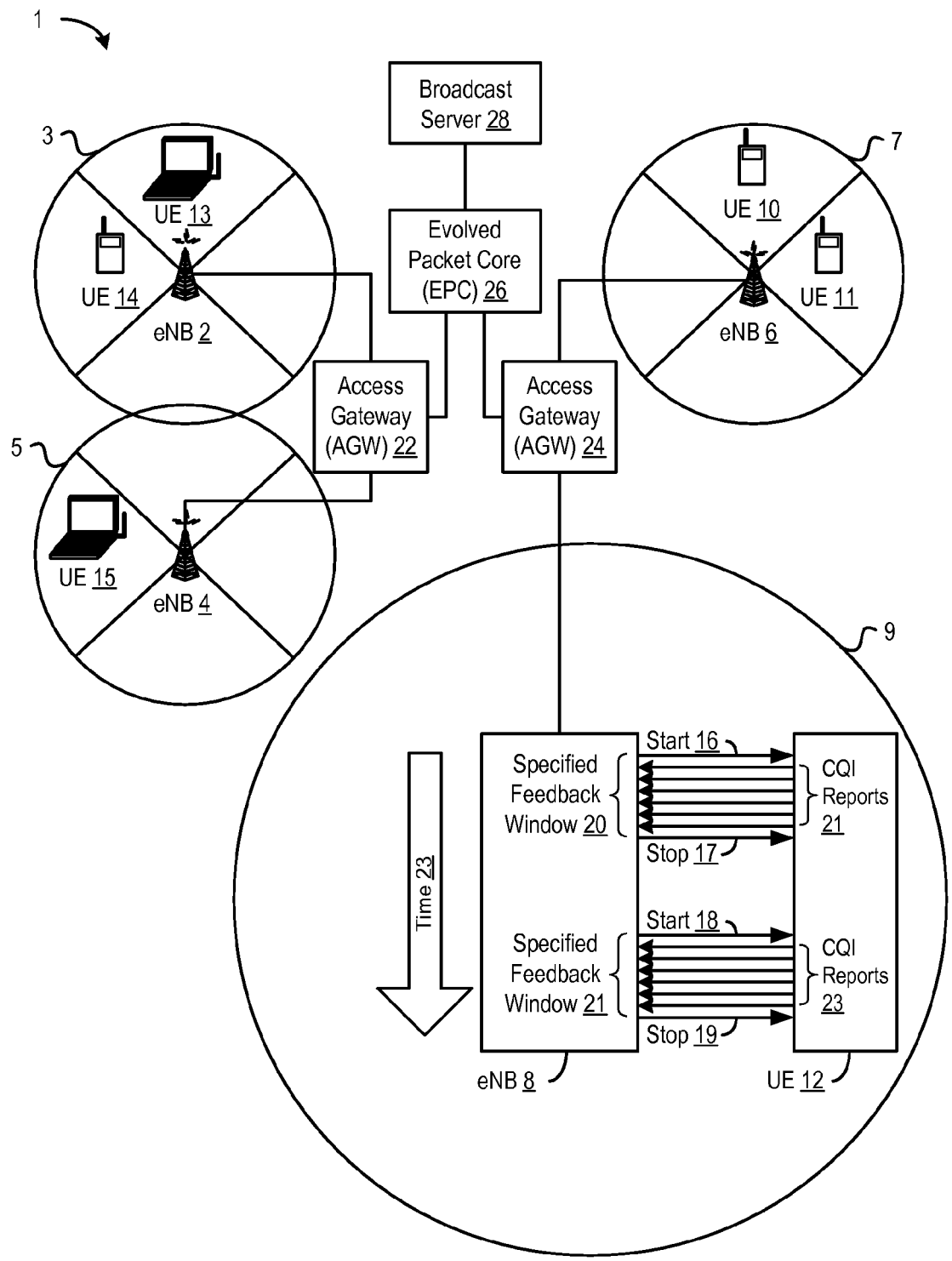
FIG. 1 schematically illustrates the architecture of an LTE wireless communication system.

A system and methodology are disclosed for feeding back channel-side information—such as channel quality indicator information, rank adaptation information and/or MIMO codebook selection information—to the base station in response to a "start feedback" message without requiring transmission of a separate configuration message to stop feedback. At the receiver/UE, channel-side information (e.g., periodic CQI reports) is fed back in response to the "start feedback" message using a configurable or default time period or window so that the receiver/UE automatically stops feeding back channel-side information upon expiration of the time period/window, thereby automatically limiting the CQI reporting by the receiver/UE. In various embodiments, the periodic CQI feedback at each receiver/UE is configured to occur only during a predetermined default reporting period or window that is initiated in response to receiving the "start feedback" message. By automatically terminating CQI reporting after a certain time window T, the control overhead signaling is reduced since there is no need for the base station to transmit a feedback stop message. While the same reporting time period or window may be used for all receiver/UEs in the cell, additional flexibility may be provided by transmitting a configurable time window value T=k×W for use in automatically terminating CQI reporting after receipt of the "start feedback" message, where "W" is configured to be the same for all receiver/UEs in the cell, and "k" can be different for different receiver/UEs or groups of receiver/UEs if required. For example, if "W" is selected to be equal to the CQI feedback period, then k×W effectively specifies the number of CQI reports to be fed back. In other embodiments, different "W," "k" or "T" parameter values may be used with different receiver/UEs, thereby allowing CQI feedback for different types of receiver/UEs to be flexibly scheduled so that different types of receiver/UEs (e.g., different UE classes or UEs having different traffic activity) can have different amounts of CQI feedback reporting. While the configurable time window value parameters T, k and W can be distributed with each "start feedback" message, the overhead associated with distributing the parameters to the receiver/UEs can be significantly reduced by configuring the receiver/UEs semi-statically on a cell/base station specific basis and/or for each receiver/UE. Additional scheduling flexibility is provided by configuring each receiver/UE to automatically extend the existing feedback reporting period/window (which may be a default window or an already extended window) upon receipt of a "continue feedback" message from the base station. The "continue feedback" message may be efficiently configured as part of the downlink or uplink grant messages using only a fraction of a bit in terms of signaling overhead, thereby allowing efficient usage of scheduling configuration messages. Alternatively, the "continue feedback" message may be implicitly conveyed when the base station sends a message or instruction (e.g., an uplink grant message) that is interpreted by the receiver/UE as an instruction to continue or extend the feedback reporting window. To provide further scheduling flexibility, an "interrupt feedback" message may also be transmitted to a receiver/UE to prematurely terminate the feedback of CQI reports that would otherwise continue until the end of the time period/window. Alternatively, the "interrupt" message may be implicitly conveyed when the base station sends a message or instruction (e.g., a sleep instruction) that is interpreted by the receiver/UE as an instruction to cease feedback immediately and before the feedback reporting window otherwise expires. In each of the embodiments described herein, the CQI feedback information is sent to the base station through the feedback control channel only during a predetermined default time period or window where it is processed to regenerate the original CQI state information and is used for scheduling and adaptive modulation control (AMC).

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory that are performed by a processing engine or unit, such as a central processing unit (CPU). Such descriptions and representations are used by those skilled in the art to describe and convey the substance of their work to others skilled in the art. Various illustrative embodiments of the present invention will now be described in detail below with reference to the figures.

Figure 2:
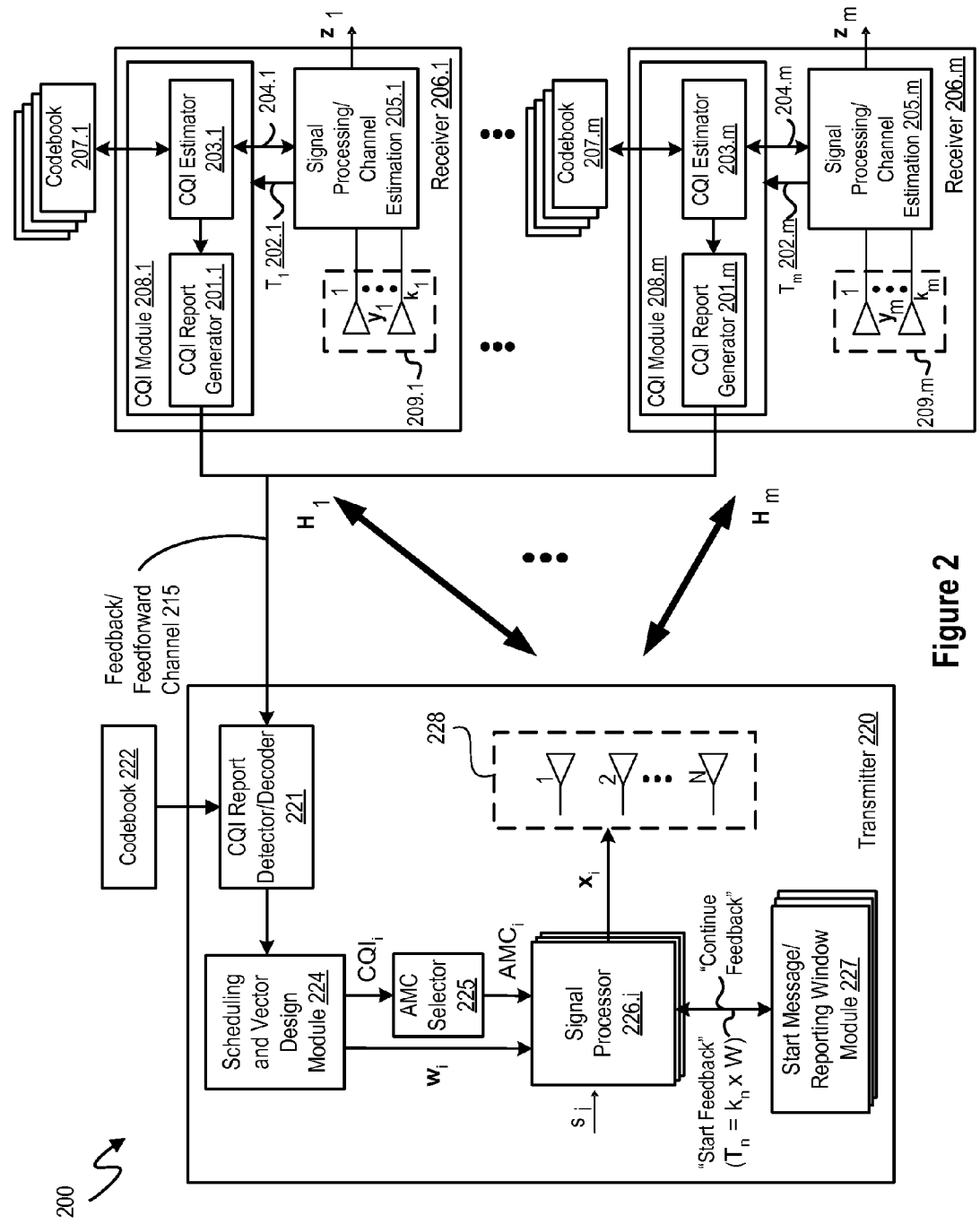
FIG. 2 depicts a wireless communication system in which one or more receiver stations feedback information to a transmitter station using a predetermined default reporting period that is initiated in response to a configurable start message.

FIG. 2 depicts a wireless communication system 200 in which one or more receiver stations 206.$i$ feedback information to a transmitter station 220 using a predetermined or default reporting period T that is initiated in response to a start message. With reference to the LTE wireless system depicted in FIG. 1, the transmitter 220 may represent any of the control transceiver devices 2, 4, 6, and/or 8 which act as a base station, while the receiver 206.$i$ may represent any of the end user devices 10-15. In the system 200 depicted in FIG. 2, one or more receiver stations 206.$i$ feedback channel-side information—such as channel quality indicator information, rank adaptation information and/or MIMO codebook selection information—to the base station 220 in response to a "start feedback" message that is generated by the start message module 227 in the transmitter 220. By specifying a reporting window T in the start message that is transmitted to the receivers 206.i, each receiver 206.i is effectively instructed to feedback channel feedback information (CFI) only during the specified reporting window T so that there is no need for the transmitter 220 to transmit a separate configuration message to stop feedback. As described herein, the specified reporting window T can be the default value that is programmed into each end user device, can be distributed with each "start feedback" message, or can be distributed to the receivers 206.i in a separate message that is transmitted periodically or on some other predetermined basis so that receivers 206.i are semi-statically configured with the specified reporting window value T.

Once configured, each receiver station 206.i may continually monitor its channel conditions, but periodic CQI reports are fed back on a feedback channel (such as a physical LTE feedback channel that supports CQI reporting) only in response to the start message and only during the specified reporting window T. At the transmitter 220, the received CQI reports are decoded to extract the generated CQI feedback information, which is used to configure or adapt one or more input signals that are transmitted from a transmitter 220 (e.g., a base station) to one or more receivers 206.1-m (e.g., subscriber stations). As will be appreciated, the transmitter station 220 and/or receiver stations 206.i include a processor, software executed by the processor, and other hardware that allow the processes used for communication and any other functions performed by the transmitter station 220 and each of receiver stations 206.i. It will also be appreciated that the transmitter station 220 can both transmit signals (over the downlink path) and receive signals (over the uplink path), and that each receiver station 206.i can receive signals (over the downlink path) and transmit signals (over the uplink path).

The transmitter 220 includes an array 228 of one or more antennas for communicating with the receivers 206.1 through 206.m, each of which includes an array 209.i having one or more antennas for communicating with the transmitter 220. In operation, a data signal $s_i$ presented at the transmitter 220 for transmission to the receiver 206.i is transformed by the signal processor 226.i into a transmission signal, represented by the vector $x_i$. The signals transmitted from the transmit antenna 228 propagate through a matrix channel $H_i$ and are received by the receive antennas 209.i where they are represented by the vector $y_i$. For a MIMO channel from the transmitter 220 to the $i^{th}$ receiver 206.i, the channel is denoted by $H_i$, $i \in \{1, 2 \ldots m\}$. The channel matrix $H_i$ may be represented as a $k_i \times N$ matrix of complex entries representing the complex coefficients of the transmission channel between each transmit-receive antenna pair, where N represents the number of transmit antennas in the transmit antenna array 228, and $k_i$ represents the number of antennas of the $i^{th}$ receiver 206.i. At the receiver 206.i, the signal processing unit 205.i processes the $y_i$ signals received on the k antennas to obtain a data signal, $z_i$, which is an estimate of the transmitted data $s_i$. The processing of the received $y_i$ signals may include combining the $y_i$ signals with appropriate combining vector information $v_i$ retrieved from the codebook 207.i or otherwise computed by the receiver's signal processing unit 205.i.

Precoding for downlink transmissions (transmitter to receiver) may be implemented by a CQI module 208.i at receiver 206.i which determines its MIMO channel matrix $H_i$—which specifies the profile of the transmission channel between a transmitter and an $i^{th}$ receiver—in the channel estimation signal processing unit 205.i. For example, in a MIMO implementation, each receiver 206.1-m determines its MIMO channel matrix $H_i$ by using pilot estimation or sounding techniques to determine or estimate the coefficients of the channel matrix $H_i$. Each receiver 206.i uses the estimated MIMO channel matrix or other channel-related information (which can be channel coefficients or channel statistics or their functions, such as a precoder, a beamforming vector or a modulation order) to generate precoding information, such as precoding and power allocation values, appropriate for the MIMO channel matrix. This may be done by using the channel-related information to access a precoder stored in the receiver codebook 207.i. In addition, each receiver 206.i uses the estimated MIMO channel matrix or other channel-related information to generate CQI information that is to be used to configure/adapt the signals transmitted by the transmitter.

Rather than feeding back the full CQI representation, the receiver 206.i may use a codebook 207.i to compress or quantize the transmission profile (e.g., CQI information) that is generated from the detected channel information and that can be used by the transmitter in controlling signal transmission to the receiver. The CQI estimator 203.i generates a quantization/codebook index by accessing the receiver codebook 207.i which stores an indexed set of possible transmission profiles and/or channel matrices $H_i$ along with associated CQI information so that the estimated channel matrix information 204.i generated by the signal processing unit 205.i can be used by the CQI estimator 203.i to retrieve a codebook index from the codebook 207.i. The output of the CQI estimator 203.i is provided to the CQI report generator 201.i that is operable to generate and feedback CQI reports in response to the extracted start message 202.i, but only for the specified reporting window $T_i$. For example, the CQI module 208.i may include a "start message" detector that detects the receipt of a start message from the transmitter 220 so that CQI information is generated and reported to the transmitter 220 via the feedback channel 215 only in response to receiving the start message and during the specified reporting window $T_i$ 202.i. In another example, the CQI module 208.i may include logic and/or circuitry (e.g., in the CQI report generator 201.i) for detecting a "continue feedback" message from the transmitter 220 so that the feedback of periodic CQI reports is extended for an additional reporting window duration (which may or may not be the same duration as the original reporting window). The CQI module 208.i may also include logic and/or circuitry (e.g., in the CQI report generator 201.i) for detecting a "interrupt feedback" message from the transmitter 220 so that the feedback of periodic CQI reports is prematurely terminated prior to the expiration of the (extended) reporting period/window.

While the precoding and/or CQI information may be generated continuously at each receiver 206.i, processing resources may be conserved by configuring the CQI module 208.i to prepare and feedback precoding information only during the reporting window T once a start message is received. In either case, the feedback of such information over the feedback channel 215 is constrained to occur only during the specified reporting window $T_i$. (or an extension thereof if a "continue feedback" message is received). Within the specified (or extended) reporting window, the generated CQI information, which may be in the form of indexed information, is transmitted via the feedback channel 215 to the transmitter 220 where it may be stored and/or processed by the CQI report detector/decoder 221. For example, a memory controller (not shown) in the CQI report detector/decoder 221 may be used to update the previously reported CQI information, either directly or using CQI information retrieved from the codebook 222. In this way, the CQI report detector/decoder 221 is operable to process the generated CQI information to provide CQI information that can be used by scheduling module 224 and AMC selection module 225 to generate scheduling or AMC information, respectively, for a particular receiver 206.$i$. In addition, the CQI report detector/decoder 221 provides the selected codeword from the codebook 222 to the schedule and vector design module 224 which computes scheduling information and designs the transmit beamforming vector $w_i$. As will be appreciated, the scheduling module 224 may be used to dynamically control which time/frequency resources are allocated to a certain receiver/UE 206.$i$ at a given time. The scheduling module 224 can instantaneously choose the best multiplexing strategy from the available methods (e.g., frequency localized or frequency distributed transmission). The flexibility in selecting resource blocks and multiplexing users will influence the available scheduling performance.

As disclosed herein, the transmitter 220 also includes a start message/reporting window module 227 which generates a start message that is transmitted to the receivers 206.$i$ to effectively specify a default reporting window T for the receivers 206.$i$. Again, the reporting window T information may be programmed as a default value in each of the receivers 206.$i$, or may be transmitted with the start message or separately therefrom. If the receivers 206.$i$ are programmed with a default reporting window T, then the default value would be used to control feedback in response to a start message without requiring any additional configuration messages to be sent. However, a configuration message could be transmitted to override the default reporting window value T with a new or adjusted reporting window value. While the same reporting window may be used for all receivers 206.$i$, additional flexibility may be provided by transmitting a configurable time window value $T=k \times W$ to the receivers 206.$i$, where "W" is configured to be the same for all receivers 206.$i$ in the cell, and "k" can be different for different receivers 206.$i$ or groups of receivers 206.$i$ if required. To provide this additional flexibility, the start message/reporting window module 227 may be configured to compute one or more configurable time window parameter values $T_n = k_n \times W$ which may be assigned and transmitted to the receivers 206.$i$ or specific groups thereof For example, if "W" is selected to be equal to the CQI feedback period, then $k_n \times W$ effectively specifies the number of CQI reports to be fed back. In this way, CQI feedback for different types of receivers can be flexibly scheduled so that different types of receivers (e.g., different UE classes or UEs having different traffic activity) can have different amounts of CQI feedback reporting. In selected embodiments, one or more of the time window value parameters $T_n$, $k_n$, W are configured and transmitted semi-statically by the start message/reporting window module 227 in each base station, thereby reducing the control signaling overhead. In another example, cell-specific time window parameter values are distributed by configuring and broadcasting a shared "W" value to all receivers 206.$i$ in the cell area, and then separately configuring and transmitting individual "k" values for each receiver (e.g., 206.1), where a default value for "k" may be used by the receiver if no configuration for "k" is received. With the time window parameters, individual "W" values may be configured and transmitted for separate groups of receivers which have different traffic or service quality characteristics, and then individual "k" values may be configured and transmitted for each receiver. Receiver-specific time window parameter values may also be distributed by separately configuring and transmitting individual "T" values for each receiver (e.g., 206.1), in which case there is no requirement to generate or track the constituent parameter values "k" and "W."

To provide additional flexibility in the scheduling of feedback, the start message/reporting window module 227 may be configured generate a "continue feedback" message that is transmitted to the receivers 206.$i$ any time during the existing reporting window T to automatically extend the feedback reporting period/window for the receiver. As will be appreciated, the "continue feedback" message may be used to extend a default reporting window or an already extended reporting window. In addition, the start message/reporting window module 227 may be configured generate an "interrupt feedback" message that is transmitted to the receivers 206.$i$ any time during the default or extended reporting window T to prematurely terminate the feedback of CQI reports that would otherwise continue until the end of the default or extended reporting window. The "continue feedback" and/or "interrupt feedback" message may be efficiently configured as part of the downlink or uplink grant messages using only a fraction of a bit in terms of signaling overhead, thereby allowing efficient usage of scheduling configuration messages.

Using downlink control signaling, the signal processor 226.$i$ informs each receiver/UE 206.$i$ what resources and respective transmission formats have been allocated. Separate downlink control messages may be distributed periodically or on some other predetermined basis to the receivers 206.$i$ to configure the receivers with the specified reporting window T or parameters k, W so that receivers 206.$i$ are semi-statically configured. Finally, downlink control messages may be used to transmit one or more start messages to the receivers 206.$i$ to signal that feedback of periodic CQI reporting can begin until such time as the (configurable) time window T has expired or a "continue feedback" message has been received. In this way, there is no need for a separate "stop feedback" message to control CQI feedback, though an "interrupt feedback" message may be transmitted to a receiver to prematurely terminate the feedback of CQI reports that would otherwise continue until the end of the (configurable or extended) time window.

Figure 3:
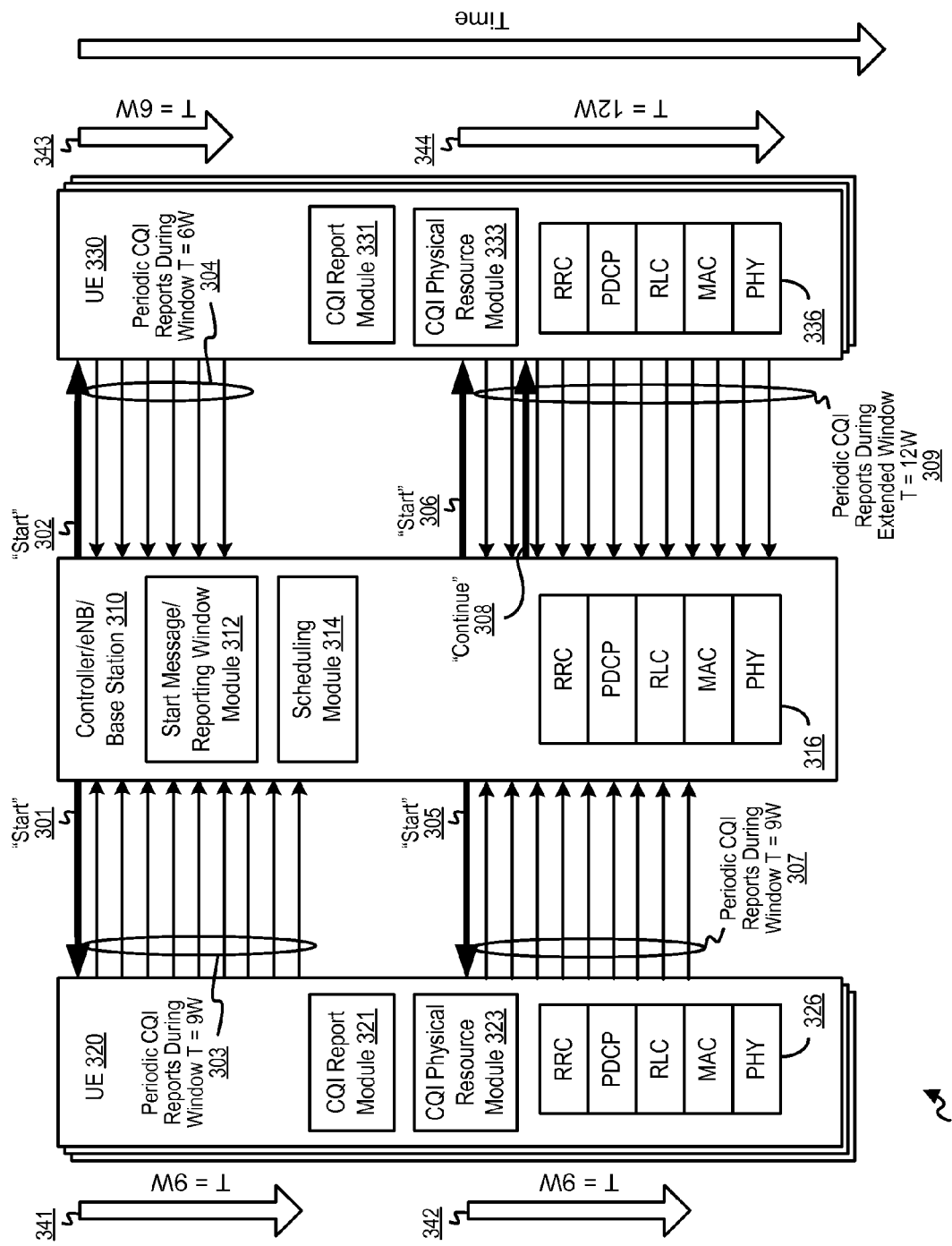
FIG. 3 illustrates selected example signal flows for efficiently controlling CQI feedback to a transmitter station with reduced downlink signaling overhead.

FIG. 3 illustrates selected example signal flows for efficiently controlling CQI feedback in a system 300 including one or more user devices 320, 330 (such as a mobile device, subscriber station or other user equipment device) to a transmitter station 310 (such as an eNB, controller or base station) with reduced downlink signaling overhead. As depicted, the transmitter station 310 exchanges messages with the user devices 320, 330 using protocol stacks 316, 326, 336, respectively. The controller 310 includes a start message module 312 for generating and transmitting one or more "start" messages 301, 305 which are used to configure the one or more user devices 320 for periodic CQI feedback during a default timeout window T such that CQI feedback stops at time T after the start message is transmitted. Thus, if multiple user devices 320 are located in the cell area for the controller 310, a first "start" message 301 is generated by the start message module 312 and transmitted to the user devices 320. While the default timeout window T value may be included in the start message 301, the user device 320 may also store the default timeout window T value for use when the start message is received.

To process the received start message 301, each user device 320 includes a CQI report module 321 which generates CQI reports 303 upon detecting receipt of a start message from the controller device 310 until expiration of the default timeout window. In FIG. 3, the user device 320 feeds back the CQI reports 303 only during the default timeout window T 341 which, in this example, is equal to the time required to provide nine periodic CQI reports. Once the CQI report module 321 determines that one or more CQI reports should be fed back during the default timeout window, the user device 320 must feedback the CQI report(s) over an appropriate feedback channel that supports CQI reporting. In selected embodiments, the feedback channel is identified by the CQI physical resource module 323, and may be implemented in whole or in part as part of the uplink control channel so that multiple user devices 320 can provide CQI reports. As will be appreciated, the feedback channel used to provide CQI reports may be directly or indirectly assigned or broadcast to each user device 320 by the controller 310, or may be independently derived at each user device 320. In a wireless 3GPP LTE system implementation, the CQI physical resource module 323 identifies an uplink control channel to periodically feedback CQI reports, precoding matrix indication (PMI) and/or rank adaptation information, where the uplink control channel may be the physical uplink control channel (PUCCH) or a physical uplink shared (data) channel (PUSCH). The PUCCH and PUSCH channels are both part of the uplink sub-frame, which is based on Single Carrier Frequency Division Multiple Access (SC-FDMA) with cyclic prefix, and can be scheduled by the controller/eNB/base station 310. As will be appreciated, the SC-FDMA feedback channel includes a central region of resource blocks that define a data channel region which is used to convey feedback data, and also includes edge of band resource blocks that define dedicated control regions which are used to convey uplink control information, such as data non-associated control information. Thus, the SC-FDMA uplink channel may be used to feedback CQI reports using the outer control channel frequencies to send CQI reports as part of the data non-associated control information.

The foregoing sequence may be repeated by sending a second "start" message 305 to the user devices 320 which are configured to generate and feedback CQI reports 307 upon receiving the start message 305 until expiration of the default timeout window T 342. To the extent that the CQI report module 321 uses the default timeout window T to determine when to stop feeding back CQI reports to the controller device 310, the feedback may be considered to be scheduled by the controller device, but without requiring the separate transmission of a separate "stop feedback" message.

To provide additional flexibility, the start message/reporting window module 312 may be provided to generate a configurable timeout window value T=k×W that may be transmitted prior to or with the "start" message 301, where "W" may be configured to be the same for all user devices 320 in the cell, and "k" can be different for different user devices if required. In addition or in the alternative, different "W" and "k" values may be assigned to sub-groups of the users 320. For example, if "W" is selected to be equal to the CQI feedback period, then k×W effectively specifies the number of CQI reports to be fed back. With a configurable timeout window parameters being adjustable, the controller 310 may generate and broadcast a semi-statically revised parameter values to define the configurable timeout window used by selected user devices 320, 330 in the cell region to autonomously feedback channel feedback information. Not only can the configurable timeout window values be used to adjust the CQI feedback window value over time for an individual user device 320, but they can also be used to configure different reporting windows for different user devices. While the start message/reporting window module 312 may be explicitly configure the configurable timeout window values (T, W, k) and send them to the user devices, an implicit configuration scheme may be used. For example, when a user device goes into a "sleep mode" to save battery power, the feedback is automatically stopped. In this case, a sleep mode activation implicitly signals a configuration of the window T.

When different reporting windows are to be used for different user devices, the start message module 312 in the controller 310 may generate and transmit "start" messages 302, 306 which prompt the user devices 330 to provide periodic CQI feedback during a separately configured timeout window T 343 such that CQI feedback stops at different time T=6 W after the start message 302 is transmitted. To process the received start message 302, the user device 330 includes a CQI report module 331 which generates CQI reports 304 upon receiving the start message 302 from the controller device 310 until expiration of the timeout window 343 (which may be specified by the start message 302 or in a separate configuration message). Thus, the user device 330 feeds back the CQI reports 304 only during the default timeout window 343 which, in this example, is equal to the time required to provide six periodic CQI reports. Once the CQI report module 331 determines that one or more CQI reports should be fed back during the default timeout window 343, the CQI physical resource module 333 identifies a feedback channel over which the user device 330 sends the CQI report(s) 304.

The foregoing sequence at the user device 330 may be repeated by sending a second "start" message to the user devices 330 which are configured to generate and feedback CQI reports in response thereto until expiration of the specified timeout window. While the foregoing signaling scheme reduces the configuration overhead by eliminating the need for a separate "stop feedback" message, the CQI messaging flexibility is also reduced by using a default reporting window. However, the CQI messaging flexibility can be increased by constructing the reporting window as a configurable set of one or more parameters (e.g., k and W described herein). The signaling flexibility may be further enhanced by configuring the start message/reporting window module 312 at the controller 310 to generate and send a "continue" message to the user device(s) at any time within an existing reporting window to extend the feedback reporting window (e.g., to an additional time period T), thereby allowing scheduling configuration messages to be efficiently used.

The ability to continue or extend a feedback reporting window may be illustrated with reference to the user device 330 shown in FIG. 3. As described above, the user device 330 may be configured to feedback CQI reports during a configurable timeout window T=6 W upon receiving a start message 302, 306. Thus, upon receiving the second "start" message 306, the user device 330 would be configured to feedback CQI reports during a configurable timeout window T=6 W. If, however, additional CQI reporting is required than can fit in the configured timeout window T=6 W, the start message/reporting window module 312 generates a "continue" message 308 that is sent to the user device 330. This "continue" message 308 can be configured and efficiently fed forward by using part of the downlink or uplink grant message, thereby requiring only a fraction of a bit in terms of overhead. In response, the CQI report module 331 extends the configured timeout window to provide additional time. In selected embodiments, the configured timeout window is extended to include an additional time period T, so that the CQI report module 331 generates CQI reports 309 until expiration of the timeout window 344 which, in this example, is equal to the time required to provide twelve periodic CQI reports (T=12× W). While the timeout window may be extended by using an extension window having the same duration as the original timeout window, any desired time interval may be used for the extension window. In addition or in the alternative, if multiple "continue" messages are received, the CQI report module 331 may be configured to extend the timeout window by a different amount for each "continue" message. For example, when a first "continue" message is received during a first or default timeout window T1, the user device may be configured to continue periodic feedback for an additional time interval of period T2 (which is different from T1), and when a second "continue" message is received, the user device may be configured to continue periodic feedback for an additional time interval of period T3 (which is different from T1 and/or T2), so on.

Additional signaling flexibility is provided by configuring the start message/reporting window module 312 at the controller 310 to generate and send an "interrupt" message to the user device(s) at any time within an existing or extended reporting window to prematurely terminate the feedback of CQI reports that would otherwise continue until the end of the current feedback reporting window. While an explicit "interrupt" message may be sent, the user devices 320, 330 may also be configured to recognize an implicit "interrupt" message from other types of messages or instructions sent by the controller 310 (e.g., an instruction that the user device should enter a sleep mode). With this capability, upon determining that additional CQI reports are not needed from one or more user devices 320, 330, the controller 310 is able to reduce the allocation of processing resources that would otherwise be required to receive CQI reports through the end of the reporting window.

As CQI reports are received at the controller 310, they are decoded and used by the scheduling module 314 to generate scheduling or AMC information which is used to transmit downlink messages to each user device 320, 330. For example, the scheduling module 314 can use the assembled CQI information for a variety of different purposes, including time/frequency selective scheduling, selection of modulation and coding scheme, interference management, and transmission power control for physical channels (e.g., physical/L2-control signaling channels).

While the description provided with reference to FIG. 3 focuses on the feedback of CQI reports, it will be appreciated that other types of channel feedback information can be fed back, with or without including CQI reports. For example, the uplink feedback messages 303, 307 may instead include rank adaptation information (or an index representative thereof) that is generated at the UE 320. Alternatively, the uplink feedback messages 303, 307 may include precoding matrix information (or an index representative thereof) which identifies directly or indirectly the MIMO channel to the receiver, such as by selecting a precoder matrix index from a MIMO codebook. In yet another alternative, the uplink feedback messages 303, 307 may include one or more of these examples of channel feedback information, or any other type of channel feedback information. When different types of channel feedback information is being fed back, each UE (e.g., 320) may have separately configure feedback reporting window parameters may be used for each type of feedback. For example, the UE 320 may be configured to feedback CQI reports every millisecond (e.g., $W_1=1$), but may be configured to feedback rank adaptation information every twenty milliseconds (e.g., $W_2=20$). Thus, different types of feedback may use different, separately configured reporting window parameters. Alternatively, the same configuration parameters may be used to configure different types of channel feedback information so that, for example, a UE 320 that receives the reporting window parameter $W_1=1$ is configured to feedback CQI reports every millisecond, and to feedback rank adaptation information every twenty milliseconds.

Figure 4:
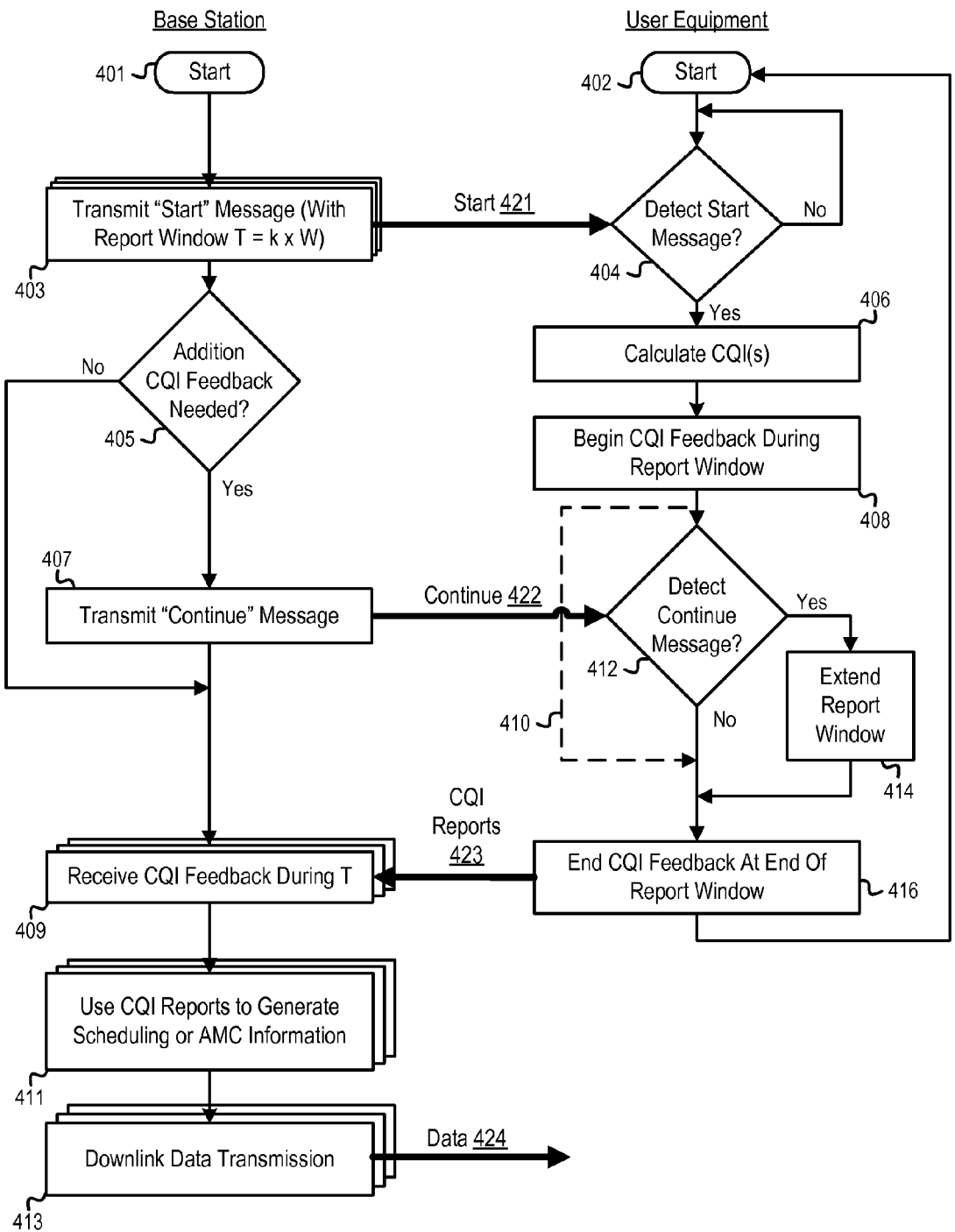
FIG. 4 depicts an example flow for efficiently controlling the feedback of CQI data for use in scheduling and AMC coding at a transmitter/base station.

FIG. 4 depicts an example flow for efficiently controlling the feedback of CQI data for use in scheduling and AMC coding at a transmitter/base station. At the base station, the methodology starts (step 401) when the base station is operative to send and receive data and control messages, including a "start" message 421 that is transmitted to the user equipment (step 403). As parenthetically indicated at step 403, the transmitted start message 421 may include a default report window value T or configurable report window values (e.g., T=kW), or the report window value(s) may be separately transmitted prior to the start message 421. In this way, the base station configures the user equipment for periodic CQI feedback in a timeout mode such that CQI feedback stops after the specified reporting window. If the base station determines at any point during the reporting window T that additional CQI feedback is needed from the user equipment (affirmative outcome to decision 405), a "continue" message 422 is transmitted to the user equipment (step 407). But if no additional feedback is required (negative outcome to decision 405), then the base station receives and processes (e.g., de-quantizes) the CQI reports 432 that are fed back by the user equipment in the specified reporting window (step 409). The base station uses the received CQI reports to generate scheduling or AMC information for the user equipment (step 411), and also designs the transmit beamforming vectors w for use in downlink transmission. Once the transmit beamforming vectors w and CQI values are computed, the precoding information is finalized and applied at step 413 as part of the downlink data transmission 424.

At the user equipment, the methodology starts (step 402) when the user equipment is operative to send and receive data and control messages. Upon detecting receipt of a "start" message 421 (affirmative outcome to step 404), the user equipment begins calculating CQI information (step 406). For example, a CQI value may be generated by using the transmission profile information to access a quantization/codebook which stores an indexed set of possible transmission profiles and/or channel matrices $H_i$ along with associated CQI information. At step 408, the user equipment begins feeding back CQI information (e.g. CQI reports 423) during the previously specified reporting window using a physical channel that supports CQI reporting. In this way and as indicated by the dashed line 410, periodic CQI reports 423 may be fed back until the end of a default reporting window (step 416) in accordance with one or more separately configurable feedback parameters (e.g., k, W described above). However, where the user equipment is configured to respond to a "continue" message 422 from the base station, the detection of such a message during an existing reporting window (affirmative outcome to decision 412) prompts the user equipment to extend the report window (step 414) so that the feedback of CQI reports (step 416) is effectively extended.

By now it should be appreciated that there has been provided a method and system for processing signals in a communication system by feeding back channel feedback information in response to a "start" message by using a predetermined reporting window, where the channel feedback information may be channel quality indicator information, rank adaptation information and/or precoding matrix information, or an index representative of any or all of the foregoing. As described, a receiving device receives a configuration message which specifies a first or default feedback window for controlling feedback of channel feedback information to the transmitting device. In various embodiments, the feedback window may be defined as a single value that is distributed to all receivers, or as one or more separately configurable parameters to allow feedback of channel feedback information from different receivers to be separately controlled. For example, the configuration message may be constructed to include first parameter W for specifying at least in part the feedback window, where the first parameter W is broadcast to some or all of the plurality of receiving devices in a cell area for the transmitting device. In addition or in the alternative, the configuration message may be constructed to include a second parameter k for specifying at least in part the feedback window, where the second parameter k may be uniquely configured for each of the plurality of receiving devices in a cell area for the transmitting device. In addition or in the alternative, the configuration message may be constructed to include a third parameter T for specifying the feedback window, where the third parameter T may be uniquely configured for each of the plurality of receiving devices in a cell area for the transmitting device. Subsequently, a first message from the transmitting device is received at the receiving device which instructs the receiving device to begin feeding back channel feedback information. In response to the first message, the receiving device transmits channel feedback information (e.g., periodic CQI reports, channel quality indicator information, rank adaptation information and/or precoding matrix information, or an index representative thereof) over an uplink channel to the transmitting device such that the channel feedback information is transmitted only during the first feedback window without requiring receipt of a separate message to stop transmission of the channel feedback information over the uplink channel. The receiving device may also be configured to receive a second message from the transmitting device which explicitly or implicitly instructs the receiving device to continue feeding back channel feedback information during an extended feedback window. In response to the second message, the receiver computes the extended feedback window, such as by extending the first feedback window by a first extension window, or by extending an existing feedback window by a second extension window. Using the extended feedback window, the receiver transmits channel feedback information over the uplink channel such that the channel feedback information is transmitted only during the extended feedback window without requiring receipt of a separate message to stop transmission of the channel feedback information over the uplink channel. As will be appreciated, the extended feedback window may be selected to be any desired duration (e.g., it may or may not be twice as long as the first feedback window). Finally, the receiving device may be configured to receive an explicit or implicit interrupt message from the transmitting device which causes the receiving device to terminate transmission of channel feedback information over the uplink channel such that the receiving device prematurely stops feedback of channel feedback information before such feedback would otherwise be stopped at the end of the feedback window.

In another form, there is provided a receiver apparatus and methodology for use in a wireless LTE communication system. The receiver includes channel detection logic that is operable to generate channel feedback information from transmission channel state information. The receiver also includes transmission logic that is operable to transmit the channel feedback information in response to receiving a first message from a transmitting device, such that the channel feedback information is transmitted only during a feedback window without requiring receipt of a separate message to stop transmission of the channel feedback information. Reporting logic at the receiver is operable to compute the feedback window in response to receiving a configuration message from a transmitting device, where the configuration message specifies the feedback window as one or more separately configurable parameters (e.g., k, W, T) for controlling transmission of channel feedback information to the transmitting device. In addition, the reporting logic is operable to compute an extended feedback window in response to receiving a continue message from the transmitting device, where the reporting logic instructs the transmission logic to continue transmitting the channel feedback information only during the extended feedback window. Finally, the reporting logic is operable to detect an interrupt message from the transmitting device, where the reporting logic instructs the transmission logic to terminate transmission of channel feedback information such that the receiver prematurely stops feedback of channel feedback information before such feedback would otherwise be stopped at the end of the feedback window.

In yet another form, there is provided a method and system for processing signals in a communication system that includes a base station and one or more user equipment devices, where the base station communicates with each user equipment device over a respective transmission channel. As described, the base station transmits a start message to one or more user equipment devices, where the start message instructs the user equipment devices to begin feeding back channel feedback information. Subsequently, the base station receives and processes channel feedback information (e.g., periodic CQI reports) the user equipment device(s) that is fed back only during a predetermined feedback window without requiring transmission by the base station of a separate message to stop feedback of the channel feedback information. To control the duration of the predetermined feedback window, the base station transmits one or more configuration messages to the user equipment devices prior to transmitting the start message, where the configuration message specifies the predetermined feedback window as one or more separately configurable parameters for controlling feedback of channel feedback information to the base station. To extend the feedback, the base station transmits a continue message to a selected user equipment device, where the continue message explicitly or implicitly instructs the selected user equipment device to continue feeding back channel feedback information during an extended feedback window. To interrupt feedback, the base station transmits an interrupt message to a selected user equipment device, where the interrupt message explicitly or implicitly instructs the selected user equipment device to terminate transmission of channel feedback information before such feedback would otherwise be stopped at the end of the predetermined feedback window.

In still yet another form, there is provided a transmitter station and methodology for use in a wireless LTE communication system. The transmitter station includes transmission logic that is operable to transmit a first message to one or more receiver stations, where the first message instructs the one or more receiver stations to begin feeding back channel feedback information only during a predetermined feedback window. The transmitter station also includes reception logic that is operable to receive channel feedback information only during the predetermined feedback window. Reporting window logic at the transmitter station is operable to generate a configuration message that specifies the predetermined window as one or more separately configurable parameters for controlling transmission of channel feedback information to the transmitter station, where the transmission logic is operable to transmit the configuration message to the one or more receiver stations. In addition, the reporting window logic is operable to generate a second message when additional channel feedback information is needed from one or more selected receiver stations than can be provided in the predetermined feedback window, where the transmission logic is operable to transmit the second message to the one or more selected receiver stations. Finally, the reporting window logic is operable to generate a third message for terminating feedback of channel feedback information from one or more selected receiver stations, where the transmission logic is operable to transmit the third message to the one or more selected receiver stations.

There is also provided a method and system for processing signals in a wireless LTE communication system where a base transceiver station communicates with one or more user equipment devices. Initially, a configuration message from a base transceiver station is received at a user equipment device, where the configuration message includes one or more separately configurable feedback window parameters (e.g., k, W, T) for specifying a predetermined window for feeding back CQI reports. At the user equipment device, channel state information is estimated for a transmission channel from the base transceiver station to the user equipment device based on one or more received signals, and the channel state information is used to generate CQI reports for the transmission channel to the user equipment device. Once the user equipment device receives a start message from the base transceiver station, the user equipment device begins feeding back CQI reports by transmitting the CQI reports using a data non-associated control portion of a single carrier frequency division multiple access (SC-FDMA) uplink channel only during the predetermined window without requiring receipt of a separate message to stop transmission of the CQI reports.

The methods and systems for using predetermined reporting windows to generate and feedback channel-side information—such as CQI information, rank adaptation information or MIMO codebook selection information—in a limited feedback system as shown and described herein may be implemented in software stored on a computer-readable medium and executed as a computer program on a general purpose or special purpose computer to perform certain tasks. For a hardware implementation, the elements used to perform various signal processing steps at the transmitter (e.g., generating and distributing start messages and reporting window values, coding and modulating the data, preceding the modulated signals, preconditioning the precoded signals, extracting CQI reports from the uplink messages and so on) and/or at the receiver (e.g., recovering the transmitted signals, demodulating and decoding the recovered signals, detecting start messages and reporting window values to control feedback of channel-side information and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various feedback systems and methods for using same, the present invention is not necessarily limited to the example embodiments illustrate herein. For example, various embodiments of a CQI feedback system and methodology disclosed herein may be implemented in connection with various proprietary or wireless communication standards, such as IEEE 802.16e, 3GPP-LTE, DVB and other multi-user systems, such as wireless MIMO systems, though CQI information can also be used in non-MIMO communication systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing signals in a communication system comprising a transmitting device and a plurality of receiving devices, the method comprising:
    receiving a first message from the transmitting device at a first receiving device, the first message instructing the first receiving device to begin feeding back channel feedback information;
    transmitting, to the transmitting device and in response to the first message, channel feedback information over an uplink channel such that the channel feedback information is transmitted only during a first feedback window and without requiring receipt of a separate message to stop transmission of the channel feedback information over the uplink channel, the channel feedback information being related to a state of one or more transmission channels;
    receiving a second message from the transmitting device at the first receiving device, where the second message instructs the first receiving device to continue feeding back the channel feedback information during an extended feedback window;
    computing the extended feedback window; and
    transmitting channel feedback information over the uplink channel to the transmitting device.

2. The method of claim 1, wherein the channel feedback information is transmitted only during the extended feedback window without requiring receipt of a separate message to stop transmission of the channel feedback information over the uplink channel.

3. The method of claim 1, where computing the extended feedback window comprises extending the first feedback window by a first extension.

4. The method of claim 1, where computing the extended feedback window comprises extending an existing feedback window by an extension window.

5. A receiver useful for communicating in a wireless communication system, comprising:
   a transceiver;
   a processor configured to run at least one computer process thereon, the at least one computer process comprising a plurality of instructions configured to, when executed:
      generate channel feedback information from transmission channel state information received from a transmitting device; and
      transmit the channel feedback information during a first feedback window in response to receiving a first message from the transmitting device;
      compute an extended feedback window in response to reception of a second message from the transmitting device;
      continue to transmit the channel feedback during the extended feedback window; and
      wherein the plurality of instructions are further configured to transmit, prior to the reception of the second message, such that the channel feedback information is transmitted only during the first feedback window without requiring receipt of a separate message from the transmitting device to stop transmission of the channel feedback information.

6. The receiver of claim 5, wherein the plurality of instructions are further configured to, after the reception of the second message, transmit such that the channel feedback information is transmitted only during the extend feedback window without requiring receipt of a separate message from the transmitting device to stop transmission of the channel feedback information.

7. The method of claim 5, wherein the computation of the extended feedback window comprises an extension of the first feedback window by an extension window.

8. A method for processing signals in a communication system comprising a transmitting device and a plurality of receiving devices, the method comprising:
   receiving a first message from the transmitting device at a first receiving device, where the first message instructs the first receiving device to begin feeding back channel feedback information; and
   transmitting channel feedback information over an uplink channel to the transmitting device and in response to the first message such that the channel feedback information is transmitted only during a first feedback window without requiring receipt of a separate message to stop transmission of the channel feedback information over the uplink channel;
   receiving a second message from the transmitting device at the first receiving device, where the second message instructs the first receiving device to continue feeding back channel feedback information during an extended feedback window;
   computing the extended feedback window; and
   transmitting channel feedback information over the uplink channel to the transmitting device and in response to the second message such that the channel feedback information is transmitted only during the extended feedback window without requiring receipt of a separate message to stop transmission of the channel feedback information over the uplink channel.

9. The method of claim 8, where computing the extended feedback window comprises extending the first feedback window by a first extension window.

10. The method of claim 8, where computing the extended feedback window comprises extending an existing feedback window by a second extension window.

11. A receiver for use in a wireless communication system, comprising:
    a transceiver interface;
    a processor; and
    a computer readable apparatus having a storage medium with at least one computer program stored thereon, the at least one computer program comprises instructions, which when executed on the processor:
       generate channel feedback information from transmission channel state information received from a transmitting device;
       transmit the channel feedback information in response to receiving a first message from the transmitting device such that the channel feedback information is transmitted only during a feedback window without requiring receipt of a separate message from the transmitting device to stop transmission of the channel feedback information;
       compute an extended feedback window in response to receiving a continue message from the transmitting device; and
       continue to transmit the channel feedback information only during the extended feedback window without requiring receipt of a separate message to stop transmission of the channel feedback information.

12. A method for processing signals in a communication system comprising a base station and one or more user equipment devices, wherein the base station communicates with each user equipment device over a respective transmission channel, the method comprising:
    transmitting one or more configuration messages for specifying at least in part the predetermined feedback window, where at least one of the one or more configuration messages is specific to at least one of the user equipment devices;
    transmitting from a base station to one or more user equipment devices a start message, where the start message instructs the one or more user equipment devices to begin feeding back channel feedback information;
    receiving channel feedback information at the base station from a user equipment device that is fed back only during a predetermined feedback window without requiring transmission by the base station of a separate message to stop feedback of the channel feedback information; and
    transmitting a continue message to a selected user equipment device, where the continue message is explicitly or implicitly signaled, thereby instructing the selected user equipment device to continue feeding back channel feedback information during an extended feedback window, where receiving channel feedback information comprises receiving channel feedback information that is fed back only during the extended feedback window without requiring transmission by the base station of a separate message to stop feedback of the channel feedback information.

13. The method of claim 12, where the extended feedback window comprises extending the predetermined feedback window by a duration equivalent to the predetermined feedback window.

14. The method of claim 12, where the extended feedback window comprises extending the predetermined feedback window by a duration that is not equivalent to the predetermined feedback window.

15. The method of claim 12, where a downlink grant message comprises the continue message.

16. The method of claim 12, where an uplink grant message comprises the continue message.

17. The method of claim 12, further comprising transmitting an interrupt feedback message thereby instructing the selected user equipment device to prematurely terminate feeding back channel feedback information.

18. The method of claim 12, where at least one of the one or more configuration messages specifies a duration for the predetermined feedback window.

19. The method of claim 12, where at least one of the one or more configuration messages specifies a duration for the extended feedback window.

20. The method of claim 12, where the one or more configuration messages are transmitted according to a periodic basis.

\* \* \* \* \*